(12) United States Patent
Samuel et al.

(10) Patent No.: US 11,339,642 B2
(45) Date of Patent: May 24, 2022

(54) PREDICTING DAMAGE TO WELLBORE TUBULARS DUE TO MULTIPLE PULSE GENERATING DEVICES

(71) Applicant: Landmark Graphics Corporation, Houston, TX (US)

(72) Inventors: Robello Samuel, Cypress, TX (US); Yuan Zhang, Missouri City, TX (US)

(73) Assignee: Landmark Graphics Corporation, Houston, TX (US)

( * ) Notice: Subject to any disclaimer, the term of this patent is extended or adjusted under 35 U.S.C. 154(b) by 420 days.

(21) Appl. No.: 16/331,256

(22) PCT Filed: Nov. 15, 2016

(86) PCT No.: PCT/US2016/061948
§ 371 (c)(1),
(2) Date: Mar. 7, 2019

(87) PCT Pub. No.: WO2018/093345
PCT Pub. Date: May 24, 2018

(65) Prior Publication Data
US 2021/0277766 A1 Sep. 9, 2021

(51) Int. Cl.
*E21B 47/007* (2012.01)
*G01H 17/00* (2006.01)

(52) U.S. Cl.
CPC ........... *E21B 47/007* (2020.05); *G01H 17/00* (2013.01)

(58) Field of Classification Search
CPC ................................ E21B 47/007; G01H 1/00
See application file for complete search history.

(56) References Cited

U.S. PATENT DOCUMENTS 5,113,379 A * 5/1992 Scherbatskoy ....... E21B 47/017
367/83
6,310,829 B1 * 10/2001 Green ..................... E21B 47/24
367/82

(Continued)

FOREIGN PATENT DOCUMENTS

WO WO 1997/045622 A1 12/1997
WO WO 2005/079224 A2 9/2005

OTHER PUBLICATIONS

International Search Report and The Written Opinion of the International Search Authority, or the Declaration, dated Jul. 28, 2017, PCT/US2016/061948, 10 pages, ISA/KR.

*Primary Examiner* — Natalie Huls
*Assistant Examiner* — Cynthia L. Davis
(74) *Attorney, Agent, or Firm* — Haynes and Boone, LLP (57) ABSTRACT

A method includes comparing a natural frequency of a tubular with a frequency of each of at least two pulse generating devices positioned adjacent each other on the tubular, the tubular and the at least two pulse generating devices comprising an energy system; adjusting the frequency of at least one of the at least two pulse generating devices when the frequency is equal to the natural frequency of the tubular and obtaining an adjusted frequency different from the natural frequency; calculating an energy distribution in the energy system based on the natural frequency and the adjusted frequency of the at least one of the at least two pulse generating devices; and determining a new location on the tubular for positioning one or more of the at least two pulse generating devices such that energy introduced into the energy system is less than energy dissipated from the energy system.

10 Claims, 6 Drawing Sheets

(56) References Cited

U.S. PATENT DOCUMENTS

| | | | |
|---|---|---|---|
| 6,502,638 | B1 | 1/2003 | Stoesz |
| 6,691,778 | B2 | 2/2004 | Cole et al. |
| 7,139,219 | B2 | 11/2006 | Kolle et al. |
| 8,025,111 | B2 | 9/2011 | Hopf |
| 8,162,078 | B2 | 4/2012 | Anderson |
| 8,272,404 | B2 | 9/2012 | Brunskill et al. |
| 8,997,855 | B2 * | 4/2015 | O'Malley ............. E21B 43/105 |
| | | | 166/177.6 |
| 9,033,003 | B2 | 5/2015 | Standen et al. |
| 9,222,312 | B2 | 12/2015 | Anderson |
| 9,273,529 | B2 | 3/2016 | Eddison et al. |
| 9,297,207 | B2 | 3/2016 | Schicker et al. |
| 2005/0236190 | A1* | 10/2005 | Walter .................. E21B 21/106 |
| | | | 175/206 |
| 2006/0048934 | A1 | 3/2006 | Charabin |
| 2012/0048619 | A1 | 3/2012 | Seutter et al. |
| 2014/0151068 | A1 | 6/2014 | Gilleylen et al. |
| 2015/0346376 | A1* | 12/2015 | Fouda ...................... G01V 3/18 |
| | | | 324/338 |
| 2016/0053547 | A1* | 2/2016 | Samuel ................... E21B 10/42 |
| | | | 175/57 |

\* cited by examiner

PREDICTING DAMAGE TO WELLBORE TUBULARS DUE TO MULTIPLE PULSE GENERATING DEVICES

PRIORITY

The present application is a U.S. National Stage patent application of International Patent Application No. PCT/US2016/061948, filed on Nov. 15, 2016, the benefit of which is claimed and the disclosure of which is incorporated herein by reference in its entirety.

BACKGROUND

Some oil and gas wellbore profiles include a horizontal wellbore (alternately referred to as lateral wellbores) extending from a vertical wellbore to increase the interface or surface area with the producing formation. As the length of the horizontal wellbore increases, friction or sticking force on a drill string being advanced within the horizontal wellbore increases. The friction is due to contact between the wall of the wellbore and drill string. As the length of the drill string increases, the portion of the drill string engaging the wall of the wellbore also increases, thus increasing the friction. The friction may also increase due to build-up of solid materials around the drill string.

Downhole pulse generating devices are sometimes coupled to the drill string to create fluctuations in fluid pressure that result in vibrating the drill string. The vibrations help maintain movement of the drill string, which is desirable during operation since the dynamic friction is substantially less than the static friction force. The vibrations also help prevent the build-up of solid materials around the drill string and prevent the drill string from becoming stuck in the well.

As the length of the drill string increases, a single pulse generating device may not be sufficient to minimize the friction, thus requiring multiple pulse generating devices to be coupled to the drill string. However, multiple pulse generating devices can result in sympathetic vibration assumed by the drill string, which can damage the drill string.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Embodiments disclosed herein generally relate to methods for predicting damage to a wellbore tubular due to multiple downhole pulse generating devices coupled thereto. More specifically, embodiments are directed to determining the potential damage to a wellbore tubular when placing multiple downhole pulse generating devices at optimized locations.

As used herein, the term wellbore tubular or "tubular," and any variation thereof, refers to any type of pipe, conduit, or tubing used in the oil and gas industry including, but not limited to, a drill string (including drill pipe, a bottom hole assembly coupled to the drill pipe, and an associated drill bit), coiled tubing, casing, wellbore liner tubing, a production string (including production tubing and other interconnected completion components), any combination thereof, and the like. The embodiments described herein are directed primarily to a drill string having multiple pulse generating devices coupled thereto. However, it should be noted that embodiments disclosed herein are equally applicable to prevent damage to other types of tubulars being advanced through a wellbore, without departing from the scope of the disclosure.

Figure 1:
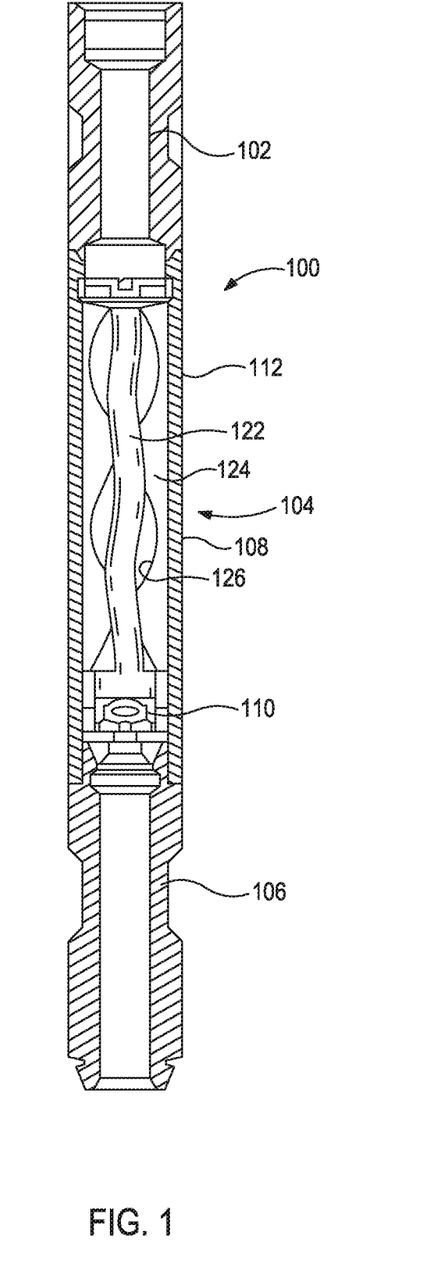
FIG. 1 is a partial cross-sectional view of an example pulse generating device.

Typically, in drilling operations, a drill string is assembled at the well surface and sequentially introduced into a wellbore drilled into the underlying Earth strata. Some wellbores, as indicated above, may include a horizontal section extending from a vertical wellbore. Depending on the length of the horizontal wellbore as described in the well plan, multiple pulse generating devices may be installed on the portion of the drill string advanced through the horizontal wellbore. As described further below, the vibrations generated by the multiple pulse generating devices can potentially damage the drill string. Thus, prior to running the drill string downhole, it may prove beneficial to predict (determine) whether the vibrations may prematurely damage the drill string and take remedial measures to prevent such damage FIG. 1 is a partial cross-sectional side view of an example pulse generating device 100. The pulse generating device 100 may also be referred to as an agitating device or an agitator. The pulse generating device 100 may be of the hydraulic type that is operated by controlling the flow of fluid (e.g., drilling mud) therethrough. Other types of pulse generating devices that are battery operated or pneumatically operated may also be used, without departing from the scope of the disclosure.

As illustrated, the pulse generating device 100 may include an upper sub 102, an agitator assembly 104, and a lower sub 106. The agitator assembly 104 includes a power section 108 that is operatively coupled to a valve assembly 110 and disposed within an outer body 112 of the pulse generating device 100. The power section 108 may include a rotor 122 and a stator 124 forming a progressive cavity motor where a fluid flow through an annulus 126 defined between the rotor 122 and the stator 124 causes the rotor 122 to rotate. It is understood that in other embodiments, other motors, torque generators, actuators, and other devices can be used in place of the power section 108.

The valve assembly 110 may be operatively coupled to the rotor 122 of the power section 108. The valve assembly 110 may be an axial flow valve, a radial flow valve, or any other valve configuration that can be operated by the power section 108. The valve assembly 110 may be selectively opened and shut to allow fluid to flow between the agitator assembly 104 and the lower sub 106. By selectively allowing fluid flow through valve assembly 110, pressure fluctuations or pressure pulses in the fluid pressure are generated in the pulse generating device 100, which creates vibrations in the pulse generating device 100. The frequency of the pressure pulses (and the resulting vibrations) generated by the pulse generating device 100 may be dependent on the time interval between the shutting and opening of the valve assembly 110. The vibrations create movement in the drill string as operatively coupled to the pulse generating device 100 and thereby reduce the friction experienced by the drill string, which causes the drill string to be conveyed through a wellbore more easily. It should be noted that the disclosure may refer to the "frequency of the pressure pulses or vibrations generated by the pulse generating device 100" as the "frequency of the pulse generating device 100." Both instances refer to the same thing and therefore may be used interchangeably throughout this disclosure.

Figure 2:
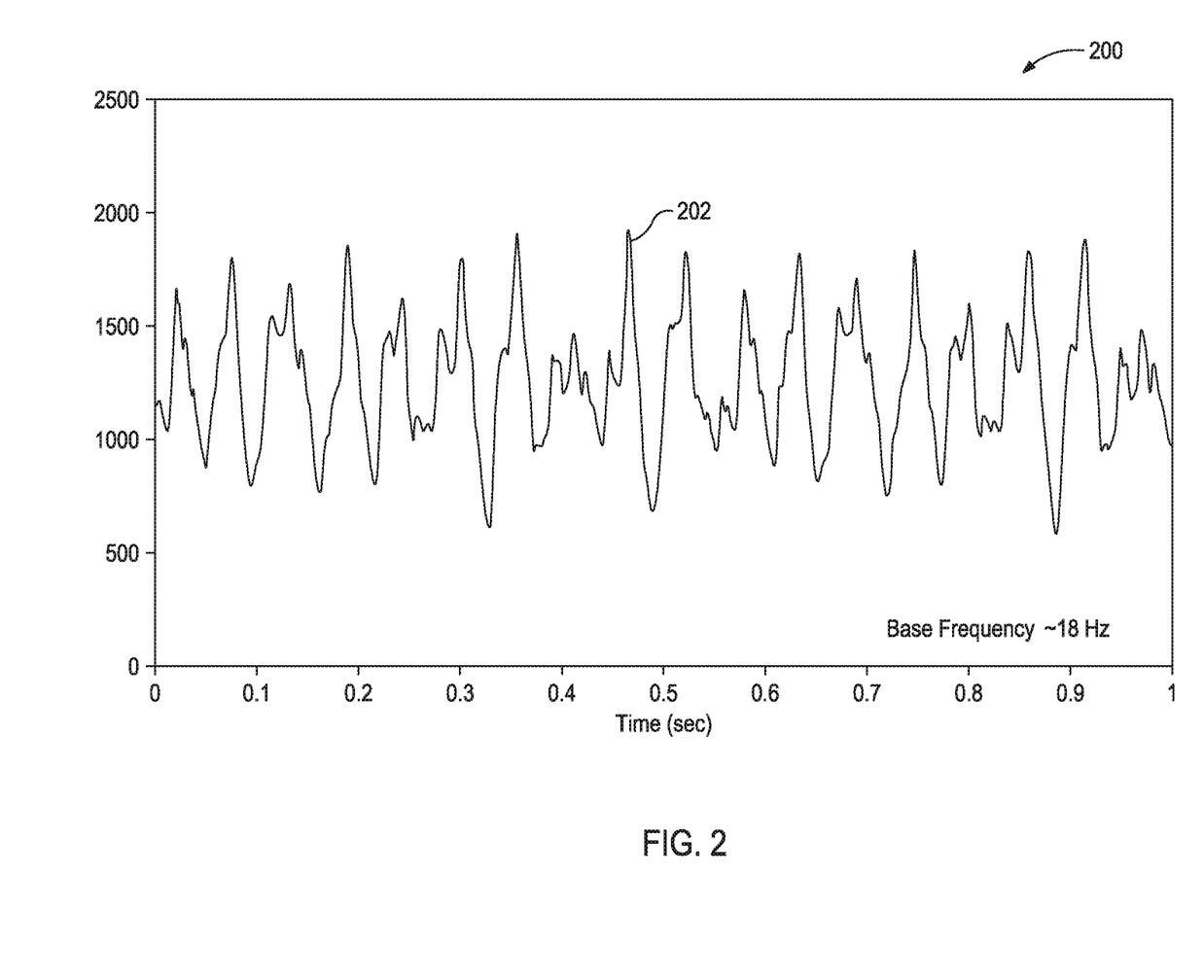
FIG. 2 is an example graph of pressure fluctuations generated by the pulse generating device of FIG. 1.

FIG. 2 is an example graph 200 of pressure fluctuations 202 generated by the pulse generating device 100. As seen, the pressure fluctuations 202 are generally periodic in nature and form a sinusoidal curve. As the length of the drill string advancing through the horizontal wellbore increases, multiple pulse generating devices (e.g., multiple pulse generating devices 100 of FIG. 1) may be required to reduce the friction between the wall of the wellbore and the drill string.

Figure 3:
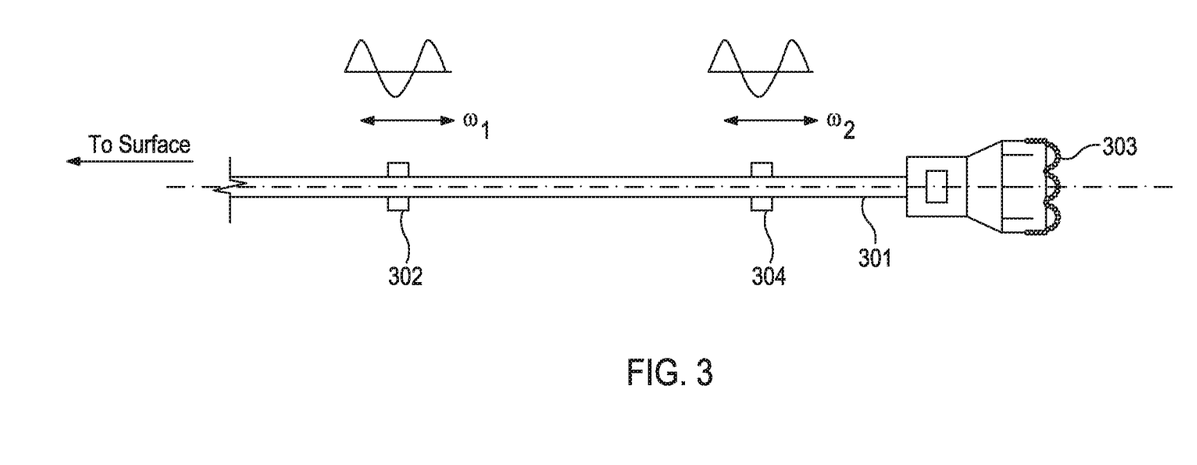
FIG. 3 illustrates a drill string having two pulse generating devices coupled thereto.

FIG. 3 illustrates a portion of an example drill string 301 having two pulse generating devices 302, 304 coupled thereto. The pulse generating devices 302, 304 may each be similar to or the same as the pulse generating device 100 of FIG. 1. Because the pulse generating devices 302, 304 are similar to each other, each pulse generating device 302, 304 may generate similar vibrations having about the same frequency. As illustrated in FIG. 3, the vibrations generated by the pulse generating devices 302, 304 propagate along the drill string 301 as stress waves ω1, ω2, respectively. As indicated, the stress waves ω1, ω2 travel uphole towards the Earth's surface and downhole towards the drill bit 303 coupled to the drill string 301.

If the frequency of the stress waves ω1, ω2 is equal to the natural frequency of the drill string 301, the drill string 301 and the pulse generating devices 302, 304 may sympathetically vibrate. As used herein, the term "sympathetic vibration" and any variation thereof refers to a vibration produced in a formerly non-vibrating body due to vibrations of about the same frequency in a neighboring body. Due to the sympathetic vibrations, the drill string 301 may be damaged.

The natural frequency of the drill string 301 is a function of one or more properties of the drill string 301 including, but not limited to, the length of the drill string 301, the elasticity of the drill string 301, the Young's modulus of the drill string 301, the density of the drill string 301, the cross-sectional area of the drill string 301, the damping coefficient of the drill string 301, and other material and physical properties of the tubulars that make up the drill string 301.

The damage to the drill string 301 may be avoided by minimizing sympathetic vibration of the drill string 301. This may be achieved by adjusting the frequency of the pulse generating devices 302, 304 or, more specifically, the frequency of the vibrations generated by the pulse generating devices 302, 304, such that the adjusted (or revised) frequency is different from the natural frequency of the drill string 301. The frequency of the pulse generating devices 302, 304 may be adjusted/chosen such that the adjusted frequency is not a harmonic of the natural frequency of the drill string 301. Stated otherwise, the frequency of the pulse generating devices 302, 304 may be adjusted such that the adjusted frequency is not a positive integer multiple of the natural frequency of the drill string 301.

Mathematically, the above relationship may be expressed as $f_{v1} \neq nf$ and $f_{v2} \neq nf$, where n is a positive integer, $f_{v1}$ and $f_{v2}$ represent the frequencies of the pulse generating devices 302, 304, respectively, and f represents the natural frequency of the drill string 301. Therefore, to minimize the sympathetic vibration in the drill string 301, the frequency of each pulse generating device 302, 304 may be adjusted such that the adjusted frequency is different from the natural frequency of the drill string 301. The frequency of each pulse generating device 302, 304 may be adjusted by altering the operation of the valve assembly of the pulse generating devices 302, 304. In an example, altering the operation may include changing the time interval between the opening and shutting of the valve assembly of the pulse generating devices 302, 304.

Figure 4A:
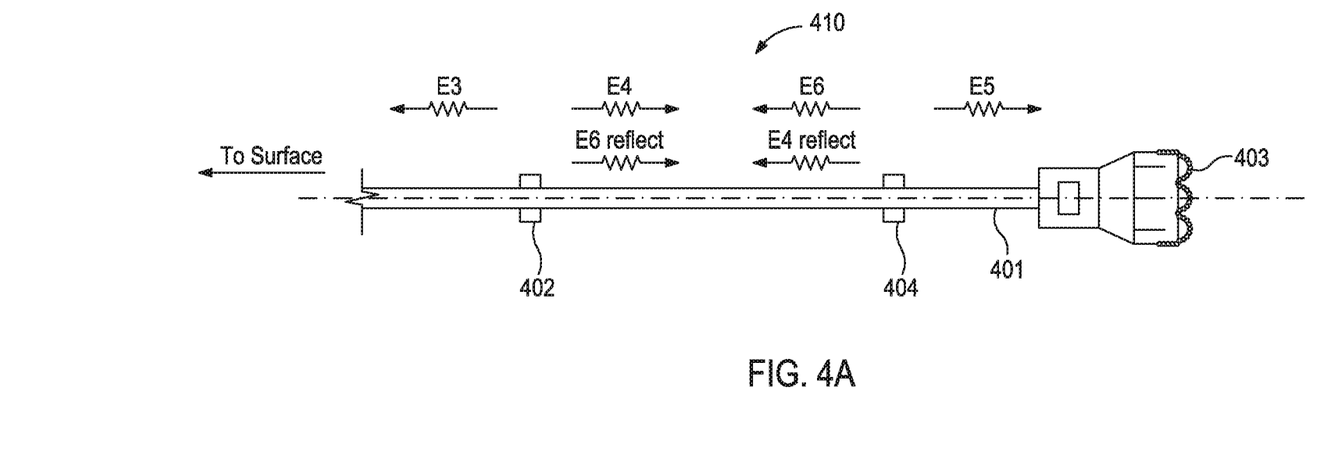
FIGS. 4A and 4B illustrate two pulse generating devices coupled adjacent to each other on a drill string.
Figure 4B:
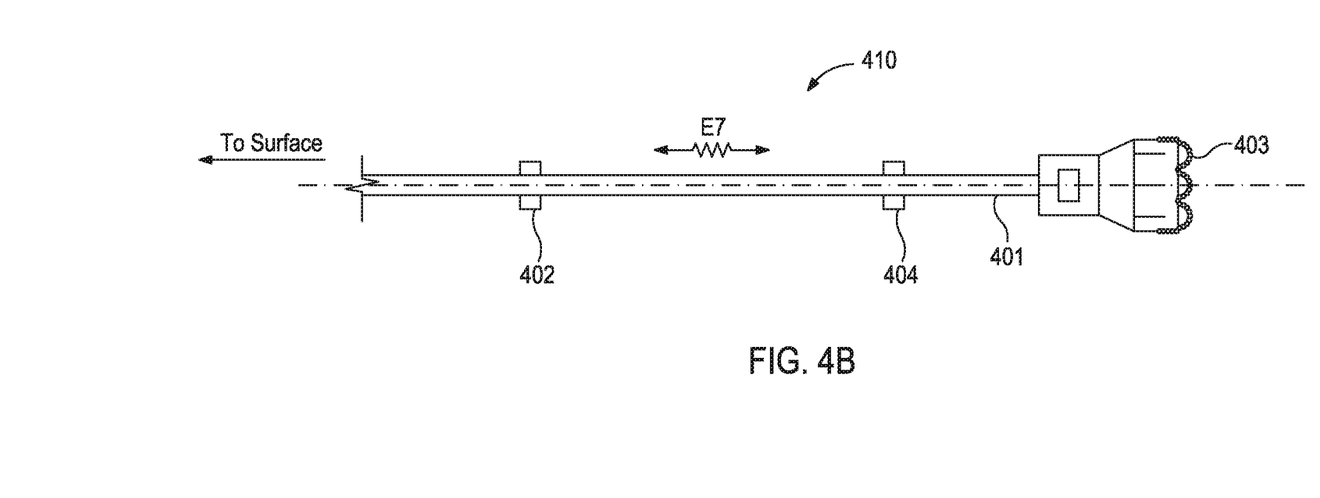

FIGS. 4A and 4B are schematic drawings of two pulse generating devices 402, 404 coupled axially adjacent to each other on a drill string 401. The pulse generating devices 402, 404 and the portion of the drill string 401 extending therebetween may constitute an energy system 410 in which the stress waves generated from the pulse generating devices 402, 404 propagate axially along the drill string 401. Each stress wave has a certain amount of energy associated therewith and which dissipates as the stress wave propagates along the drill string 401. As illustrated in FIG. 4A, stress waves having energies E3 and E4 (referred to herein as stress waves E3, E4) are generated by the first pulse generating device 402 and stress waves having energies E5 and E6 (referred to herein as stress waves E5, E6) are generated by the second pulse generating device 404. The stress wave E3 propagates uphole in the direction of the Earth's surface and dissipates relatively quickly due to the friction between the drill string 401 and the wall of the wellbore. The stress wave E5 propagates downhole towards the drill bit 403 coupled to the distal end of the drill string 401 and dissipates into the drill bit 403 (which is relatively more rigid than the drill string 401). Therefore, for the sake of explanation, the effect of the stress waves E3 and E5 on the energy system is negligible and can be ignored.

When a stress wave encounters an interface between two dissimilar materials or two different cross-sectional areas, the stress wave reflects in-part and transmits in-part at the interface. In addition, some of the energy of the stress wave may be lost during propagation due to the dampening effect of the drill string 401.

In FIG. 4A, the stress wave E4 propagates towards the second pulse generating device 404 and is reflected in-part by the second pulse generating device 404, causing a stress wave $E4_{reflect}$ to propagate towards the first pulse generating device 402. Similarly, the stress wave E6 propagates towards the first pulse generating device 402 and is reflected in-part at the first pulse generating device 402, causing a stress wave $E6_{reflect}$ to propagate back towards the second pulse generating device 404. Although not illustrated in FIG. 4A, it should be noted that portions of the stress waves E4 and E6 are also transmitted by the pulse generating devices 404, 402, respectively. However, the transmitted portions are ignored herein for the sake of simplicity.

Due to opposing reflection, the stress waves E4 and E6 may be "trapped" between the pulse generating devices 402, 404 or, alternatively, in the energy system 410. If the frequencies of the stress waves E4 and E6 are similar (e.g., harmonic), the stress waves may combine to create a new stress wave having a higher amplitude (and energy) than the individual stress waves E4 and E6.

FIG. 4B illustrates a new stress wave E7 that may be formed in the energy system 410 due to combining the stress waves E4 and E6. Thus, it will be understood that by generating and reflecting the stress waves, the pulse generating devices 402, 404 may potentially increase the energy in the energy system 410 to the detriment of the system 410. Alternatively, by transmitting the stress waves, the pulse generating devices 402, 404 may decrease the energy in the energy system 410. The energy in the energy system 410 may also be reduced due to the damping of the energy system 410. If the amount of the energy increase in the energy system 410 is greater than the amount of energy decrease in the energy system 410, then the energy (and amplitude) of the stress wave E7 may increase over time and the resulting reflected stress wave E7 may damage the drill string 401.

To minimize the energy of the stress wave E7 and, in turn, the potential damage to the drill string 401, it is required that the energy introduced into the energy system 410 should be less than the energy dissipating from the energy system 410. This energy distribution criterion may be expressed as:

$$E_{agitator} + E_{reflect} < E_{transmit} + E_{damp} \quad \text{Equation (1)}$$

wherein $E_{agitator}$ represents the energy introduced into the energy system 410 due to the stress wave generated from the pulse generating devices 402, 404, $E_{reflect}$ represents the energy introduced into the energy system 410 due to the stress waves reflected from each pulse generating device 402, 404, $E_{transmit}$ represents the energy of the stress waves dissipating from the energy system 410 due to stress waves transmitted from each pulse generating device 402, 404, and $E_{damp}$ represents the energy dissipating from the energy system 410 due to natural damping of the energy system 410. Stress wave theory and other techniques known in the art may be used to calculate the energies $E_{agitator}$, $E_{reflect}$, $E_{transmit}$, and $E_{damp}$. The energy (e.g., the energies $E_{agitator}$ and $E_{reflect}$) introduced into the energy system 410 and, thereby, the energy of the stress wave E7, may be reduced by varying the location of one or more of the pulse generating devices 402, 404 on the drill string 401. The new locations of the pulse generating devices 402, 404 on the drill string 401 may be determined iteratively until the energy distribution criterion is satisfied. It will be understood that, although the energy distribution criterion has been discussed with reference to two pulse generating devices, the energy distribution criterion is equally applicable when more than two pulse generating devices are coupled to the drill string, without departing from the scope of the disclosure.

From the embodiments disclosed above, it will be understood that multiple pulse generating devices can cause sympathetic vibrations and stress wave reflections that can prematurely damage a wellbore tubular. In order to predict whether the tubular will be damaged due to multiple pulse generating devices coupled thereto, firstly, the natural frequency of the tubular and the frequencies of the pulse generating devices are compared to determine if sympathetic vibration may occur. Secondly, it is determined whether the energy distribution criterion in the energy system formed by the multiple pulse generating devices and the tubular extending therebetween is satisfied.

Figure 5:
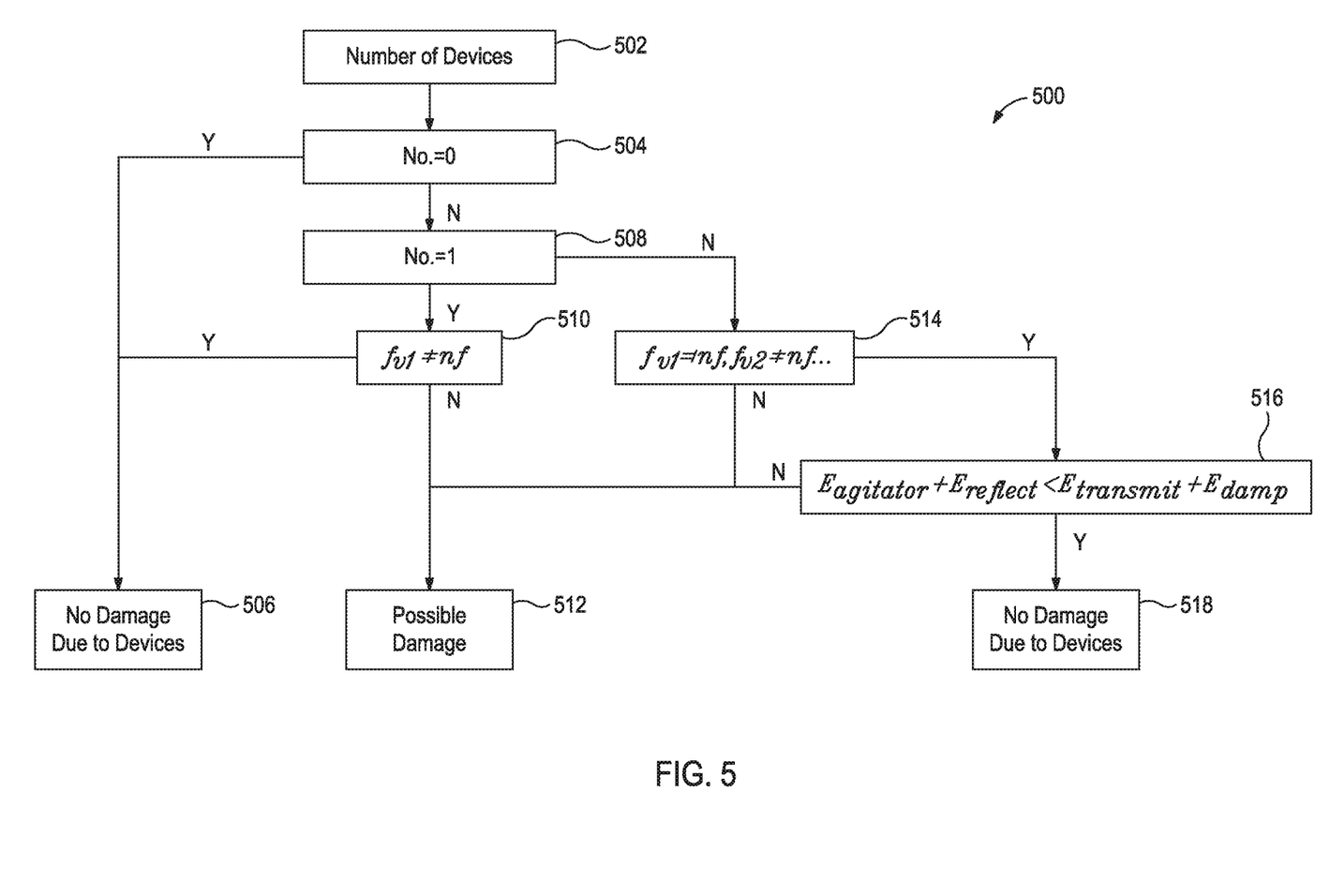
FIG. 5 illustrates a flow chart of an example method of predicting damage to a wellbore tubular due to multiple pulse generating devices coupled thereto.

FIG. 5 illustrates a flow chart of an example method 500 of predicting damage to a wellbore tubular due to multiple pulse generating devices coupled thereto. The method 500 begins by determining the number of pulse generating devices coupled to the tubular, as at 502. Specifically, the method determines the number of pulse generating devices that are coupled to a portion of the tubular that will be advanced through a horizontal portion of a wellbore.

If the number of pulse generating devices is determined to be zero, as at 504, then there will be no damage to the tubular caused by pulse generating devices, as indicated at 506. If the number of pulse generating devices is determined to be non-zero at 504, the method then checks whether a single pulse generating device is coupled to the tubular, as at 508. If only one pulse generating device is present, the method compares the frequency of the pulse generating device (or, more specifically, the frequency of the vibrations generated by the pulse generating device) with the natural frequency of the tubular, as at 510. If the frequency of the pulse generating device is not equal to the natural frequency of the tubular, then it is determined that there may be no damage to the tubular, as at 506. If the frequency of the pulse generating device is equal to the natural frequency of the tubular, then it may be concluded that the tubular may potentially be damaged because of the pulse generating device, as at 512. Remedial measures may be undertaken to minimize the possibility of damage to the tubular. For instance, the wellbore operator or drilling technician may adjust the frequency of the pulse generating device such that the adjusted frequency is different from the natural frequency of the tubular, or may use a different pulse generating device having a frequency different from the natural frequency of the tubular.

If at 508 it is determined that multiple (more than one) pulse generating devices are present, then the frequency of each pulse generating device is compared with the natural frequency of the tubular, as at 514. If the frequency of at least one pulse generating device is determined to be equal to the natural frequency of the tubular, then it may be determined that the vibrations due to the at least one pulse generating device may potentially damage the tubular, as at 512. Remedial measures may be then undertaken to minimize the possibility of damage to the tubular. For instance, the wellbore operator or drilling technician may adjust the frequency of the pulse generating device(s) having a frequency equal to the natural frequency of the tubular such that the adjusted frequency is different from the natural frequency of the tubular. Alternatively, the wellbore operator or drilling technician may use different pulse generating device(s) having a frequency different from the natural frequency of the tubular.

If each pulse generating device is determined to have a frequency different from the natural frequency of the tubular, then the method 500 may calculate the energy distribution due to the multiple pulse generating devices, as at 516. In some embodiments, the energy distribution may be calculated based on the natural frequency and the adjusted frequency of the at least one of the at least two pulse generating devices, and may be based on the energy distribution criterion of Equation (1) above. If the energy distribution criterion is satisfied, it may be concluded that there may be no damage to the tubular, as at 518. Else, it may be concluded that the tubular may potentially be damaged, as at 512.

Remedial measures may be undertaken to minimize the possibility of damage to the tubular when the energy distribution criterion is not satisfied. For instance, the remedial measures may include changing the location of the pulse generating devices on the tubular. As mentioned above, this is an iterative process that is performed until the energy distribution criterion is satisfied.

Figure 6:
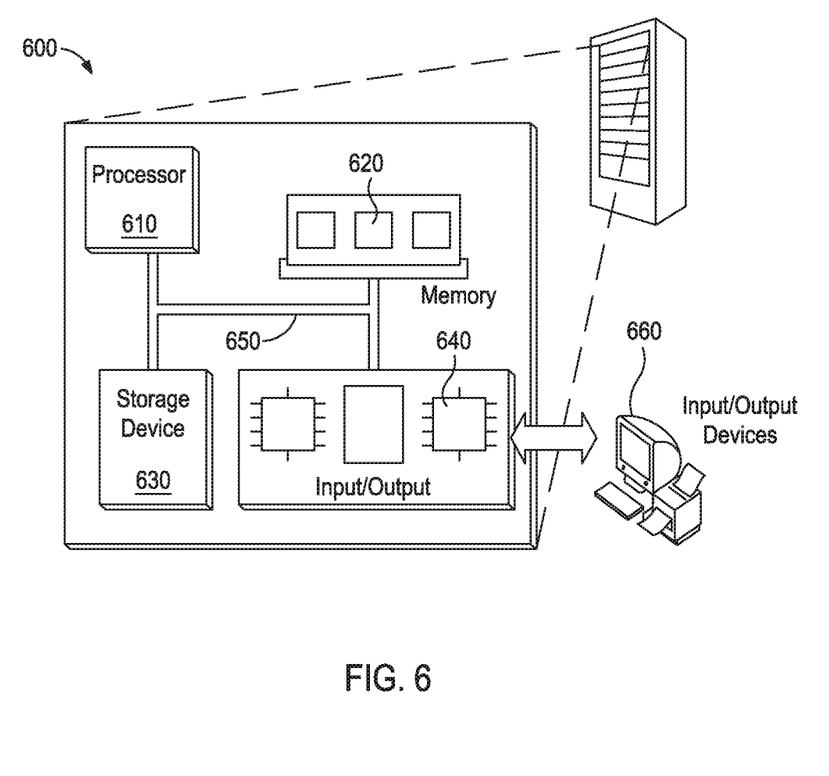
FIG. 6 illustrates an exemplary computer system for performing the method of FIG. 5 and other tasks disclosed herein.

FIG. 6 illustrates an example computer system 600 for predicting the possibility of damage to a tubular (e.g., a drill string 401 of FIGS. 4A and 4B) because of multiple pulse generating devices (e.g., pulse generating devices 402, 404 of FIGS. 4A and 4B) coupled thereto. The computer system 600 may be located at a wellsite or may be located at a remote location from the wellsite, and able to receive input data and provide processed results via wired or wireless telecommunication methods. In an embodiment, the computer system 600 may be provided with input data including, but not limited to, the frequency of the each pulse generating device coupled to the tubular, the location of each pulse generating device on the tubular, the length (and other physical properties) of the tubular, the structure and composition of the wellbore and the surrounding formation, and the like.

The computer system 600 may include a processor 610, computer-readable storage media such as memory 620 and a storage device 630, and an input/output device 640. Each of the components 610, 620, 630, and 640 may be interconnected, for example, using a system bus 650. The processor 610 may process instructions for execution within the computer system 600. In some embodiments, the processor 610 is a single-threaded processor, a multi-threaded processor, a system on a chip, a special purpose logic circuitry, e.g., an FPGA (field programmable gate array) or an ASIC (application specific integrated circuit), or another type of processor. The processor 610 may execute a computer-readable program code stored in the memory 620 or on the storage device 630. The memory 620 and the storage device 630 include non-transitory computer-readable media such as random access memory (RAM) devices, read only memory (ROM) devices, optical devices (e.g., CDs or DVDs), semiconductor memory devices (e.g., EPROM, EEPROM, flash memory devices, and others), magnetic disks (e.g., internal hard disks, removable disks, and others), and magneto-optical disks.

The input/output device 640 may perform input/output operations for providing the above-mentioned input data to the computer system 600. The computer system 600 may process the input data and provide the processing results using the input/output device 640. For example, the processing results may include the natural frequency of the tubular, energy distribution in the tubular and the pulse generating devices, and/or an indication whether the energy distribution criterion based on the energy distribution is satisfied. Based on the results, the locations of one or more pulse generating devices coupled to the tubular may be changed such that the energy distribution criterion is satisfied and/or the frequency of one or more pulse generating devices may be changed to be different from the natural frequency.

In some embodiments, the input/output device 640 can include one or more network interface devices, e.g., an Ethernet card; a serial communication device, e.g., an RS-232 port; and/or a wireless interface device, e.g., an 802.11 card, a 3G wireless modem, or a 4G wireless modem. In some embodiments, the input/output device 640 can include driver devices configured to receive input data and send output data to other input/output devices 660 including, for example, a keyboard, a pointing device (e.g., a mouse, a trackball, a tablet, a touch sensitive screen, or another type of pointing device), a printer, and display devices (e.g., a monitor, or another type of display device) for displaying information to a user. Other kinds of devices can be used to provide for interaction with the user as well; for example, feedback provided to the user can be any form of sensory feedback, e.g., visual feedback, auditory feedback, or tactile feedback; and input from the user can be received in any form, including acoustic, speech, or tactile input. In some embodiments, mobile computing devices, mobile communication devices, and other devices can be used.

The computer system 600 may include a single processing system, or may be a part of multiple processing systems that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective processing systems and having a client-server relationship to each other.

Embodiments disclosed herein include:

A. A method, comprising comparing a natural frequency of a tubular with a frequency of each of at least two pulse generating devices positioned adjacent each other on the tubular, the tubular and the at least two pulse generating devices comprising an energy system; adjusting the frequency of at least one of the at least two pulse generating devices when the frequency is equal to the natural frequency of the tubular and thereby obtaining an adjusted frequency different from the natural frequency; calculating an energy distribution in the energy system based on the natural frequency and the adjusted frequency of the at least one of the at least two pulse generating devices; and determining a new location on the tubular for positioning one or more of the at least two pulse generating devices such that an amount of energy introduced into the energy system is less than an amount of energy dissipated from the energy system.

B. A system, comprising a tubular having at least two pulse generating devices positioned on the tubular axially adjacent to each other, the tubular and the at least two pulse generating devices comprising an energy system; a computer system including a processor and a non-transitory computer readable medium storing a computer readable program code that when executed by the processor causes the computer system to: receive data including a frequency of each pulse generating device of the at least two pulse generating devices and a location of each pulse generating device on the tubular; calculate an energy distribution in the energy system; and determine whether an amount of energy introduced into the energy system is less than an amount of energy dissipated from the energy system.

C. A computer program product embodied in a non-transitory computer-readable medium and comprising a computer readable program code that, when executed by a computer system, causes the computer system to: receive data including a frequency of each pulse generating device of at least two pulse generating devices coupled adjacent to each other on a tubular and a location of each pulse generating device on the tubular, the tubular and the at least two pulse generating devices comprising an energy system; calculate an energy distribution in the energy system; and determine whether an amount of energy introduced into the energy system is less than an amount of energy dissipated from the energy system.

Each of embodiments A, B, and C may have one or more of the following additional elements in any combination: Element 1: wherein adjusting the frequency of the at least one of the at least two pulse generating devices comprises adjusting the frequency such that sympathetic vibrations in the tubular are minimized. Element 2: wherein calculating the energy distribution in the energy system comprises calculating the energy distribution in the at least two pulse generating devices and a portion of the tubular extending therebetween. Element 3: further comprising calculating energy of stress waves generated, reflected, and transmitted by the at least two pulse generating devices, and calculating the energy of stress waves dissipated due to damping of the at least two pulse generating devices and the portion of the tubular extending therebetween.

Element 4: wherein executing the program code further causes the computer system to calculate the energy distribution in the at least two pulse generating devices and a portion of the tubular extending therebetween. Element 5: wherein executing the program code further causes the computer system to calculate the energy distribution by calculating energy of stress waves generated, reflected, and transmitted by the at least two pulse generating devices, and to calculate the energy of stress waves dissipated due to damping of the at least two pulse generating devices and the portion of the tubular extending therebetween.

By way of non-limiting example, exemplary combinations applicable to A, B, and C include: Element 2 with Element 3; and Element 4 with Element 5.

Therefore, embodiments disclosed are well adapted to attain the ends and advantages mentioned as well as those that are inherent therein. The particular embodiments disclosed above are illustrative only, as the embodiments may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method, comprising:
comparing a natural frequency of a tubular with a frequency of each of at least two pulse generating devices positioned adjacent each other on the tubular, the tubular and the at least two pulse generating devices constituting an energy system;
adjusting the frequency of at least one of the at least two pulse generating devices when the frequency is equal to the natural frequency of the tubular and thereby obtaining an adjusted frequency different from the natural frequency;
calculating an energy distribution in the energy system based on the natural frequency and the adjusted frequency of the at least one of the at least two pulse generating devices; and
determining a new location on the tubular for positioning one or more of the at least two pulse generating devices such that an amount of energy introduced into the energy system is less than an amount of energy dissipated from the energy system.

2. The method of claim 1, wherein adjusting the frequency of the at least one of the at least two pulse generating devices comprises adjusting the frequency such that sympathetic vibrations in the tubular are minimized.

3. The method of claim 1, wherein calculating the energy distribution in the energy system comprises calculating the energy distribution in the at least two pulse generating devices and a portion of the tubular extending therebetween.

4. The method of claim 3, further comprising:
calculating energy of stress waves generated, reflected, and transmitted by the at least two pulse generating devices; and
calculating the energy of stress waves dissipated due to damping of the at least two pulse generating devices and the portion of the tubular extending therebetween.

5. A system, comprising:
a tubular having at least two pulse generating devices positioned on the tubular axially adjacent to each other, the tubular and the at least two pulse generating devices constituting an energy system;
a computer system including a processor and a non-transitory computer readable medium storing a computer readable program code that, when executed by the processor, causes the computer system to:
receive data including a frequency of each pulse generating device of the at least two pulse generating devices and a location of each pulse generating device on the tubular;
calculate an energy distribution in the energy system based on the frequency of each pulse generating device and a natural frequency of the tubular; and
determine whether an amount of energy introduced into the energy system is less than an amount of energy dissipated from the energy system.

6. The system of claim 5, wherein executing the program code further causes the computer system to calculate the energy distribution in the at least two pulse generating devices and a portion of the tubular extending therebetween.

7. The system of claim 6, wherein executing the program code further causes the computer system to calculate the energy distribution by calculating energy of stress waves generated, reflected, and transmitted by the at least two pulse generating devices, and to calculate the energy of stress waves dissipated due to damping of the at least two pulse generating devices and the portion of the tubular extending therebetween.

8. A computer program product embodied in a non-transitory computer-readable medium and comprising a computer readable program code that, when executed by a computer system, causes the computer system to:
receive data including a frequency of each pulse generating device of at least two pulse generating devices coupled adjacent to each other on a tubular and a location of each pulse generating device on the tubular, the tubular and the at least two pulse generating devices constituting an energy system;

calculate an energy distribution in the energy system based on the frequency of each pulse generating device and a natural frequency of the tubular; and determine whether an amount of energy introduced into the energy system is less than an amount of energy dissipated from the energy system, based on the calculated energy distribution, wherein the location of at least one of the pulse generating devices on the tubular is adjusted until the amount of energy introduced into the energy system is determined to be less than the amount of energy dissipated from the energy system.

9. The computer program product of claim 8, wherein executing the program code further causes the computer system to calculate the energy distribution in the at least two pulse generating devices and a portion of the tubular extending therebetween.

10. The computer program product of claim 9, wherein executing the program code further causes the computer system to calculate the energy distribution by calculating energy of stress waves generated, reflected, and transmitted by the at least two pulse generating devices, and to calculate the energy of stress waves dissipated due to damping of the at least two pulse generating devices and the portion of the tubular extending therebetween.

* * * * *